(12) United States Patent
Swett et al.

(10) Patent No.: US 11,010,325 B2
(45) Date of Patent: May 18, 2021

(54) MEMORY CARD SLOT INTERFACE ADAPTER

(71) Applicant: Microsoft Technology Licensing, LLC, Redmond, WA (US)

(72) Inventors: Adam Nelson Swett, Seattle, WA (US); Vlad Radu Calugaru, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/536,835

(22) Filed: Aug. 9, 2019

(65) Prior Publication Data

US 2021/0042256 A1 Feb. 11, 2021

(51) Int. Cl.
| | |
|---|---|
| *G06F 13/42* | (2006.01) |
| *G06K 19/077* | (2006.01) |
| *H01R 31/06* | (2006.01) |
| *H01R 27/02* | (2006.01) |
| *G06F 13/40* | (2006.01) |

(52) U.S. Cl.
CPC ...... *G06F 13/4221* (2013.01); *G06F 13/4027* (2013.01); *G06F 13/4282* (2013.01); *G06K 19/07741* (2013.01); *H01R 27/02* (2013.01); *H01R 31/06* (2013.01); *G06F 2213/0026* (2013.01); *G06F 2213/3804* (2013.01)

(58) Field of Classification Search
CPC ............ G06F 13/4221; G06F 13/4027; G06F 13/4282; G06F 2213/0026; G06F 2213/3804; H01R 27/02; H01R 31/06; G06K 19/07741
See application file for complete search history.

(56) References Cited

U.S. PATENT DOCUMENTS

| | | | |
|---|---|---|---|
| 9,715,472 B2 | 7/2017 | Chang | |
| 9,886,071 B2 | 2/2018 | Chew et al. | |
| 2004/0076048 A1* | 4/2004 | Kabenjian | G06F 13/409 365/200 |
| 2004/0087213 A1* | 5/2004 | Kao | G06K 19/07732 439/638 |

(Continued)

FOREIGN PATENT DOCUMENTS

| | | |
|---|---|---|
| CN | 204441665 U | 7/2015 |
| CN | 107248644 A | 10/2017 |

OTHER PUBLICATIONS

"Blackjet TX-1CXQ Thunderbolt 3 CFexpress Type B/ XQD Reader", Retrieved from: https://www.atechflash.com/blackjet-tx1cxq, Retrieved Date: Apr. 11, 2019, 3 Pages.

(Continued)

*Primary Examiner* — Henry Tsai
*Assistant Examiner* — Aurangzeb Hassan
(74) *Attorney, Agent, or Firm* — Holzer Patel Drennan

(57) ABSTRACT

An adapter includes a first coupling component and a second coupling component to establish bidirectional communications between two processing devices by passing data signals through a memory card slot on one of the devices. The adapter includes a first coupling interface configured to couple with the memory card slot on a first one of the two processing devices and further includes a second coupling interface configured to couple with a second processing device. The second coupling interface is of a different form factor than the first coupling interface.

18 Claims, 4 Drawing Sheets

(56) References Cited

U.S. PATENT DOCUMENTS

| | | | |
|---|---|---|---|
| 2007/0011372 A1 | 1/2007 | Wang | |
| 2009/0132739 A1* | 5/2009 | Kang | G06F 21/10 |
| | | | 710/68 |
| 2010/0178777 A1 | 7/2010 | Chen et al. | |
| 2011/0066837 A1* | 3/2011 | Lee | G06F 9/4401 |
| | | | 713/2 |
| 2011/0087804 A1 | 4/2011 | Okaue et al. | |
| 2013/0179610 A1* | 7/2013 | Smurthwaite | H01R 13/665 |
| | | | 710/63 |
| 2015/0156481 A1* | 6/2015 | Varga | H04N 7/18 |
| | | | 348/47 |
| 2017/0228333 A1* | 8/2017 | Hayashi | G06F 3/0679 |
| 2017/0262845 A1* | 9/2017 | Eisen | G06Q 20/3274 |
| 2018/0131148 A1 | 5/2018 | Liu | |
| 2019/0204882 A1* | 7/2019 | Tseng | H01R 27/02 |
| 2019/0377516 A1* | 12/2019 | Rao | G06F 3/0604 |
| 2020/0097403 A1* | 3/2020 | Saxena | G06F 12/0269 |

OTHER PUBLICATIONS

Han, Jakub, "ProGrade Digital Unveils 1TB Industry First CFexpress Memory Card", Retrieved from: https://www.cinema5d.com/prograde-digital-unveils-1tb-industry-first-cfexpress-memory-card/, Apr. 20, 2018, 7 Pages.

Tanous, Jim, "Thunderbolt 3 to adopt USB-C Connector at 40 Gbps", Retrieved from: https://www.tekrevue.com/thunderbolt-3-usb-c/, Jun. 2, 2015, 4 Pages.

"International Search Report and Written Opinion Issued in PCT Application No. PCT/US2020/037978", dated Aug. 20, 2020, 10 Pages.

* cited by examiner

MEMORY CARD SLOT INTERFACE ADAPTER

BACKGROUND

Some computing device include ports for expandable storage, such as memory card slots or ports for receiving input from external storage devices such as hard drive devices (HDDs) and solid state devices (SSDs). Although different users may prefer to utilize the computing device in conjunction with different types of external storage devices, device manufacturing cost is directly proportional the number and types of expandable storage ports included.

SUMMARY

Figure 1:
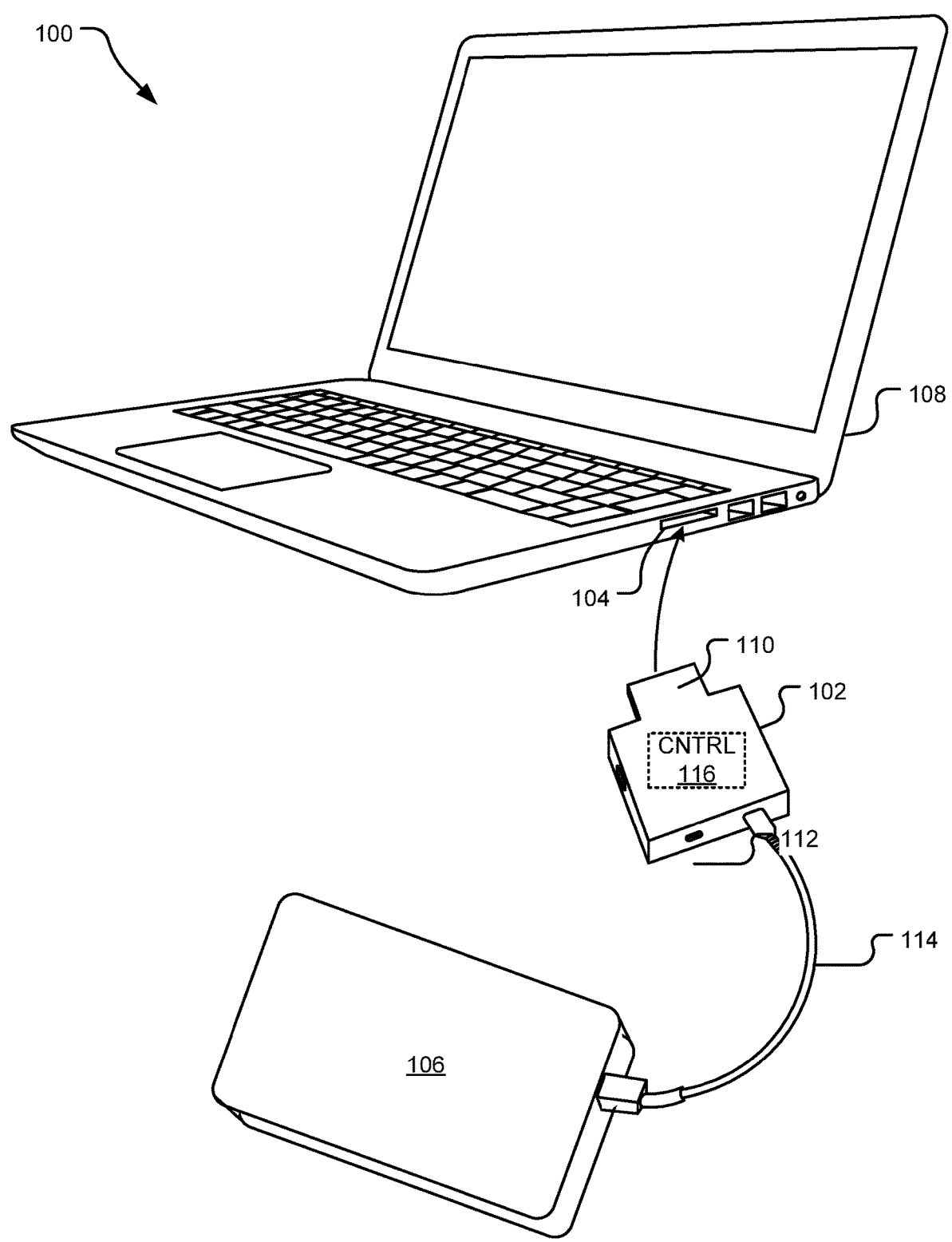
FIG. 1 illustrates an example system including an adapter that provides an interface for using a memory card slot as a communication channel between two independent processing devices.

The herein disclosed technology includes an adapter that provides an interface for using a memory card slot as a communication channel between two independent processing devices. The adapter includes at least a first coupling component that couples with a memory card slot on a first processing device and a second coupling component adapted to mechanically and electrically couple the adapter to a second processing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Certain electronics devices are manufactured to be compatible with removable memory cards that provide expandable storage. Memory cards typically make use solid state nonvolatile memory, such as Flash or DRAM, and may be designed to implement different interface standards and/or leverage different communication protocols when communicating with processing devices. Example memory cards include devices such as Secure Digital (SD) cards, secure digital high capacity (SDHC) cards, CompactFlash (CF) and CompactFlash Express (CFX) card, SmartMedia cards, XD picture cards, USB cards, Smart Cards, etc. These various types of memory cards lack independent processors and are usually associated with electronic devices such as a digital camera, smartphones, tablets, and gaming consoles.

Memory cards offer various advantages over hard drive disk (HDD) storage including increased portability due to reduced size and weight, faster data access speeds, and reduced noise due to lack of moving parts. Despite these advantages, certain memory cards are cost-prohibitive to consumers. A typical memory card may have a lower storage capacity and much higher cost than a high-capacity HDD.

Due to the above considerations, some personal electronics devices are manufactured to provide interface compatibility with both HDDs and memory cards. For example, a personal electronic device may include a both a USB port for coupling to an external HDD assembly while also including a memory card slot for receiving a removable memory card. However, the inclusion of multiple ports of different form factors drives the costs of electronics that are, in some cases, on the cusp of being cost-prohibitive to a large subset of consumers.

The herein disclosed technology provides an adapter component that allows a user to plug a first processing device (e.g., an HDA, external SSD, or other electronic device or accessory) into a memory card port on a second processing device and effectively use the memory card slot as a communication channel between the two separate processing devices. This configuration allows data from the first processing device to be read by the second processing device through the memory card port and be used as if the data were stored on a memory card rather than an external independent processing device (e.g., a device with an independent processor and, in some cases, power source). According to one implementation, the disclosed adapter allows a user to effectively couple an external storage device (e.g., an external HDD) to an otherwise non-compatible secondary device, such as a tablet, cell phone, or gaming console. This is accomplished by plugging the external storage device into an input/output interface on the adapter and by inserting a portion of the adapter into a memory card slot in the secondary device. Effectively, the disclosed adaptor replaces one or more ports traditionally included on the processing device in addition to the memory card slot, significantly reducing manufacturing cost of the processing device.

FIG. 1 illustrates an example system 100 including an adapter 102 that provides an interface for using a memory card slot 104 as a communication channel between two independent processing devices. The adapter 102 includes a first coupling component 110 and a second coupling component 112 that form respective couplings to complete a data transmission path between a first processing device 106 and a second processing device 108. The first coupling component 110 is of a first form factor designed to mate with the memory card slot 104 in the second processing device 108, while the second coupling component 112 is of a second different form factor (e.g., an input/port) designed to mate either directly or indirectly with the first processing device 106.

In one implementation, the first coupling component 110 is a male connector component of a memory card form factor that is adapted for insertion into the memory card slot 104. As used herein, "memory card form factor" refers to a form factor of a physical connector that is designed for insertion into and mating with a memory card slot in a processing device.

In different implementations, the second coupling component 112 may assume a variety of different forms including those of male or female connector components designed to mate directly or indirectly the first processing device 106. However, in FIG. 1, the second coupling component 112 is shown to be an input/output port that mates with a male connector component of a cable 114 to couple to the first processing device 106.

In different implementations, the first coupling component 110 and the second coupling component 112 may facilitate data transmissions according to different interface standards. Example interface standards commonly used in storage devices include, by example and without limitation, Serial ATA (SATA), M.2, USB, Serial Attached SCSI (SAS), FireWire, accelerated graphics port (AGP), peripheral component interconnect (PCI), peripheral component internet express (PCI Express or PCIe), and PCIe slot connectors. In digital video technologies, common interface standards include DVI, HDMI, and DisplayPort. Although different physical connector components are often designed to facilitate communications according to different interface standards, there are some different types of connector components that use a common interface standard. For example, a Type-C USB connector component and a compact flash express (CFX) memory card both communicate using PCIe links.

Interface components implementing a particular interface standard (e.g., PCIe, USB, HDMI) may support communications via one or more different signaling protocols. The signaling protocol is, for example, a working set of rules governing how data is formatted or exchanged, such as by providing for a specific addressing format, numbers of bits per data packet, speed of communications, etc. The select signaling protocol used to transmit data across any physical depends on the identity of processing device(s) transmitting and/or receiving the data.

Some processing devices include controllers adapted to communicate in two or more signaling protocols using a common interface standard. For example, a Thunderbolt controller uses a PCIe physical interface to selectively communicate incoming and outgoing signals of USB protocol, PCIe protocol, or Thunderbolt protocol. An exemplary Thunderbolt-capable device includes a Thunderbolt controller that selects the signaling protocol for outgoing signals based on the identity and preferred signaling protocol of the device receiving the communications. If, for example, the receiving device also includes a Thunderbolt controller, the Thunderbolt controller in the first device formats outgoing communications according to a Thunderbolt data protocol. If, in contrast, the receiving device includes a PCIe controller but is incapable of communicating via the Thunderbolt data protocol, the Thunderbolt controller formats outgoing communications according to a PCIe signaling protocol. Alternatively, if the receiving device includes a USB controller but no Thunderbolt controller, the Thunderbolt controller may determine a highest-speed USB protocol that is known to both controllers and communicate per that particular USB protocol.

In one implementation, the adapter 102 includes a controller 116 including a hardware and/or a combination of hardware and software (e.g., firmware) for converting a signal received from the first processing device 106 to a signaling protocol recognized by the second processing device 108. The nature of this signaling protocol version may vary from one implementation to another. In one example where the controller 116 is a Thunderbolt controller and the second coupling component 112 is a Type-C USB connector, the controller 116 receives data according to the Thunderbolt protocol from the first processing device 106 and converts the data to a signaling protocol that is preferred by a controller at a target endpoint within the second processing device 108. Likewise, the controller 116 may convert an incoming USB protocol data signal to an outgoing PCIe protocol signal (and vice versa), or perform translation between any two different signaling protocols used by the first processing device 106 and the second processing device 108.

In some implementations, the controller 116 does not alter the signaling protocol between received and outgoing signals passing through the adapter 102. For instance, in the implementation where the controller 116 is a Thunderbolt controller, there may use scenarios when both the data inputs and outputs of the controller 116 are of the PCIe data protocol despite flowing through the coupling components 110 and 112 that are of different physical form factors.

In some implementations, the controller 116 performs multiplexing and demultiplexing operations. For example, when data is communicated via the Thunderbolt signaling protocol, the first processing device 106 may include a Thunderbolt controller that multiplexes together PCIe and DisplayPort signals (if both signals are requested/used). In this scenario, the multiplexed signal is transmitted across the cable 114, and the controller 116 (e.g., another Thunderbolt controller) in the adapter 102 de-multiplexes the signal into respective PCIe and DisplayPort components and directs them accordingly along PCIe links using the PCIe signaling protocol for the PCIe signal component and the DisplayPort signaling protocol for the display port component.

By directing data and/or performing one or more other operations generally described above (e.g., signal protocol translation, multiplexing/demultiplexing), the controller 116 in the adapter 102 serves as a translation interface that permits bidirectional communications between the first processing device 106 and the second processing device 108 through the memory card slot on the second processing device 108.

In at least one implementation, controller 116 transmits data signals between the first processing device 106 and the second processing device 108 without storing data locally within the adapter. By example and without limitation, the first processing device 106 is shown to be an external storage device (e.g., an external hard drive or solid state storage device) and the second processing device 108 is shown to be a gaming console with memory expansion supported via the memory card slot 104. In this implementation, the first processing device 106 may, for example, be a hard drive disk or other external storage device the provides stored data to the gaming console through the adapter 102 and the memory card slot 104.

In various implementations, the second processing device 108 may assume the form of any processing device with a memory card slot such as a mobile phone, tablet, laptop, set-top box, etc. Likewise, the first processing device 106 may also assume a variety of forms. In one implementation, the first processing device 106 is a flash memory stick adapted for insertion into the second coupling component 112 on the adapter 102. For example, the flash memory stick includes a flash controller that communicates with the controller 116 in the adapter 102 to send and receive data. In another implementation, the first processing device 106 does not include non-volatile memory storage. For example, the first processing device may be a graphics processing unit (GPU) that communicates with the second processing device 108 through the adapter 102 to provide the second processing device 108 with increased RAM for processing operations.

By using the memory card slot 104 and adapter 102 as shown and generally described above, a user is provided with the same functionality as in the scenario where the second processing device 108 is manufactured to include both the memory card slot 104 and a coupling component suitable for establishing a communication interface with the first processing device 106. This reduces processing costs of the second processing device 108 and provides the user with the option to purchase the second processing device 108 and the adapter 102 at different times, staggering personal costs at the user's convenience. Additionally, the adapter 102 offers flexibility on form factors that may not have been contemplated by the manufacture including form factors not yet developed.

Figure 2A:
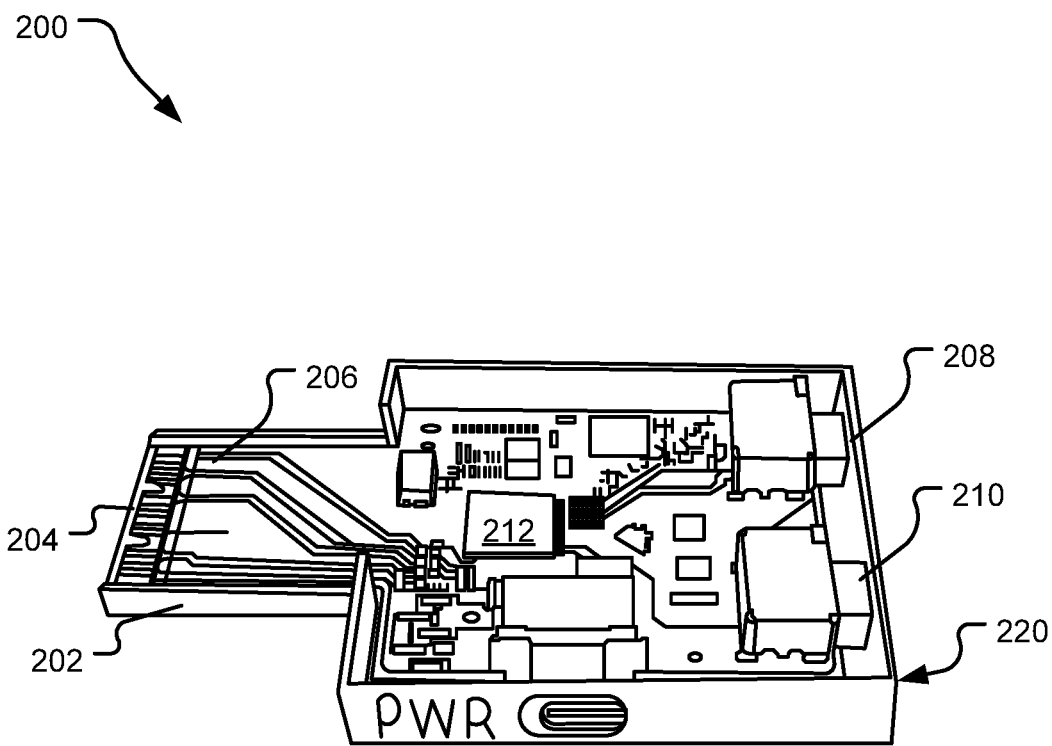
FIG. 2A illustrates a perspective view of an example adapter that may be used to establish a communication channel between two independent processing devices through a memory card slot in one of the devices.
Figure 2B:
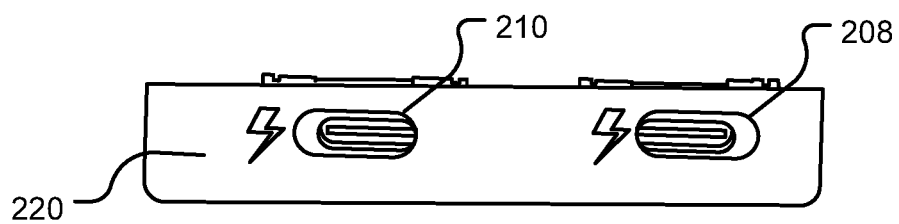
FIG. 2B illustrates a side view of the adapter component shown in FIG. 2A.

FIG. 2A-2B illustrate different views of an example adapter 200 that may be used to establish a communication channel between two independent processing devices through a memory card slot in one of the devices. In these figures, a top casing of the adapter 200 is shown selectively removed. FIG. 2A illustrates a top perspective view of the adapter 200 while FIG. 2B illustrates a back side surface 220 that is not visible in FIG. 2A.

The adapter 200 includes a first coupling component 202 of a memory card form factor. The first coupling component 202 is shown to include a number of pins 204 and signal traces 206. The pins 204 and signal traces 206 provide data connections according to different interface standards in different implementations. In one implementation, the pins 204 and signal traces 206 form a PCI express (PCIe) link that is adapted to mate with a PCI-based memory card expansion slot on a first computing device. In general, the term "PCIe link" refers to a point-to-point communication channel between two PCI Express endpoints (e.g., controllers) that allow both ports to send and receive ordinary PCI requests (e.g., configuration, I/O, or memory read/write). At the physical level, a PCIe link is composed of one or more lanes. Low-speed peripherals may use a single lane link, while a graphics adapter uses a much faster link with a greater number of lanes (e.g., 16 lanes).

The form factor of the first coupling component 202 may be any memory card form factor. In implementations where the first coupling component 202 includes a PCIe link, the first coupling component 202 may have a form factor of any memory card that utilizes a PCIe link including, for example, that of a compact express card (CFX) card or M.2 card.

The adaptor 200 additionally includes one or more secondary coupling components 208, 210 designed to facilitate physical couplings with a second processing device (not shown). The secondary coupling components 208, 210, have a physical form factor that is different than the memory card form factor of the first coupling component 202. In one implementation, the secondary coupling components 208, 210 are USB C-Type connection components (e.g., either female ports as shown or male connectors) or other connectors utilized to communicate via one or more high-speed protocols.

Figure 3:
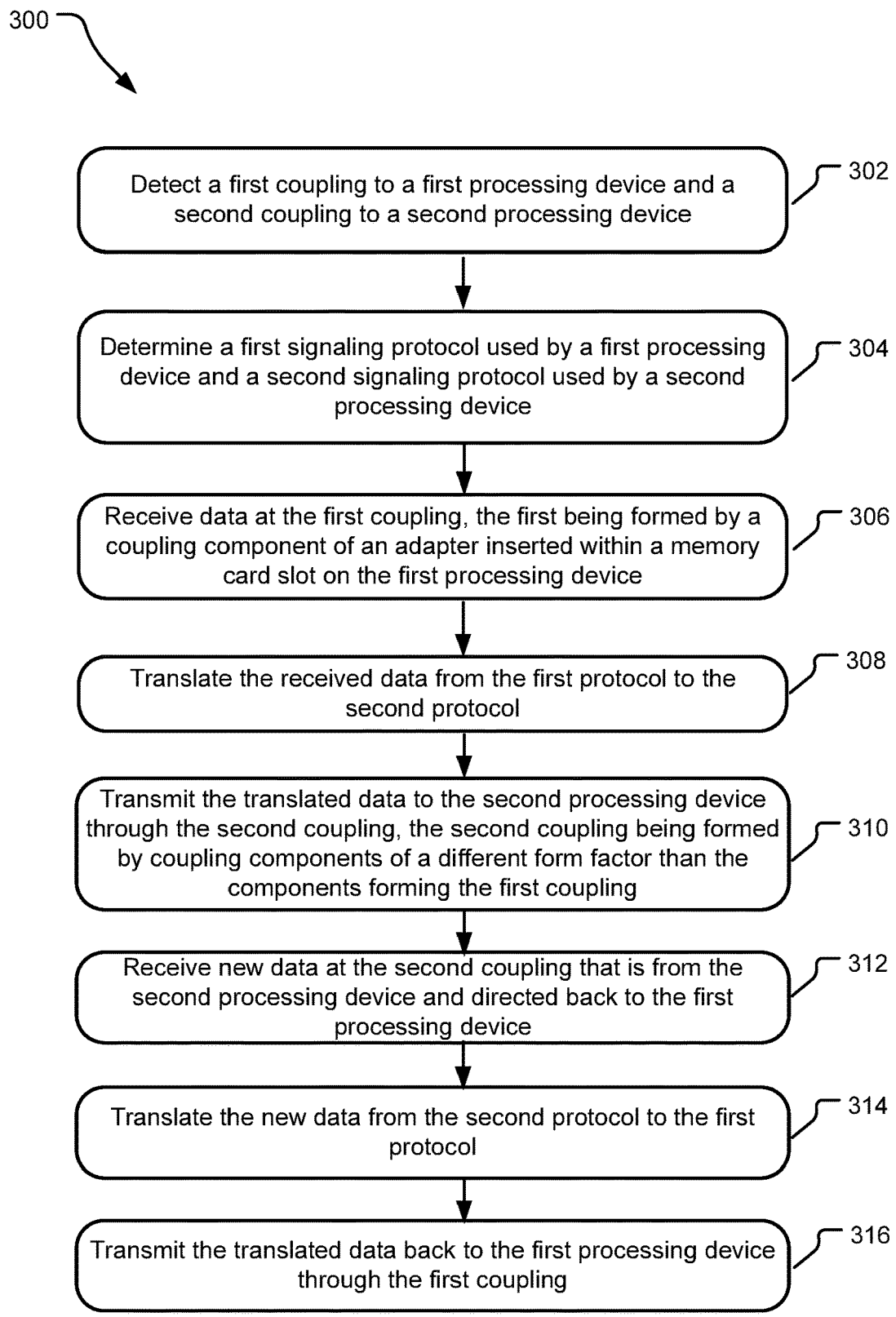
FIG. 3 illustrates example operations for using an adapter to establish a communication channel between two independent processing devices through a memory card slot in one of the devices.

Although the adapter 200 of FIG. 2 includes two ports (e.g., secondary coupling components 208 and 210) for selective coupling to a secondary processing device, some implementations of the adapter 200 may include a single coupling component for such purpose or three or more such coupling components. In FIG. 3, the secondary coupling components 208 and 210 are shown to be of identical form factor (e.g., USB Type-C input/output ports); however, some implementations of the adaptor 200 may include two or more non-identical coupling components that are both used to couple a processing device to the adapter 200 (e.g., and to thereby tether the processing device to a another processing device with a memory card slot coupled to the adapter). Regardless of the number, the secondary coupling components 208, 210 may assume a variety of different form factors including without limitation USB A-Type connection components, USB B-Type connection components, USB C-Type connection components, micro-USB, mini USB, M.2, etc.

In FIG. 2, the adapter 200 includes a controller 212 that redirects data between the connection interfaces formed by the first coupling component 202 and the secondary coupling components 208, 210. In general, the controller 212 may perform functions the same or similar to those described above with respect to the controller 116 of FIG. 1 including, for example, performing a translation of the signaling protocol used to format incoming and outgoing data packets, multiplexing and demultiplexing signals traveling in different directions, and otherwise directing data between the connection components of two processing devices otherwise incapable of coupling with one another.

In one implementation where the secondary coupling components 208, 210 are USB C-Type connectors, the controller 212 is a Thunderbolt controller. In this implementation, the controller 212 may be adapted to translate signals received according to a Thunderbolt signal protocol (e.g., Thunderbolt 3 at speeds up to 40 Gb/s) to that of another signaling protocol, such as a PCIe signal protocol if the coupling component 202 is coupled to a processing device that utilizes PCIe rather than Thunderbolt.

In FIG. 2, the adapter 200 is additionally shown to include a power input port 214 that supplies power to the controller 212. For example, a cable may be used to connect the power input port 214 to a power output port on either processing device coupled to the adapter or—alternatively—to an external power source such as a power outlet, or a portable battery. In another implementation, the adapter 200 includes a rechargeable battery. In still another implementation, the adapter 200 includes a dedicated power supply across the memory card connector.

Although a variety of connector types may be used to supply power to the adaptor 200, the power input port 214 is, in one implementation, a USB Type-C input port.

FIG. 3 illustrates example operations 300 for establishing a communication channel between two independent processing devices through a memory card slot in one of the devices. According to one implementation, each of the operations in FIG. 300 is performed by a controller within an adapter that establishes a communication path between a first processing device (e.g., through the memory card slot) and a second processing device. The adapter includes two different coupling components of different form factors that are adapted to couple with the first processing device and the second processing device, respectively.

A detection operation 302 detects a first coupling to a first processing device and a second coupling to a second processing device. A determining operation 304 determines, in response to the detected couplings, a first signaling protocol that is used by the first processing device and a second signaling protocol that is used by the second processing device. For example, the signaling protocol information may be determined via a "handshake" that is performed to initialize communications between the controller in the adapter and a controller included in each of the first processing device and the second processing device.

After this exchange of handshake information, a receiving operation 306 receives data at the first coupling. In one implementation, the first coupling is includes an interface between a memory card slot in the first processing device and a first coupling component of the adapter that has a memory card form factor compatible with the memory card slot. Upon receipt of the data, a protocol translation operation 308 that translates the data received from the first processing device from the first signaling protocol to the second signaling protocol. A data transmission operation 310 transmits the translated data to the second processing device through the second coupling. The second coupling is formed between coupling components that are of a different form factor than the coupling components forming the first coupling (e.g., the coupling components forming the second coupling are not physically compatible with the memory card slot on the first processing device).

A receiving operation 312 receives new data at the second coupling that is from the second processing device and directed back to the first processing device. Another protocol translation operation translates the new data from the second protocol to the first protocol, and a transmission operation 314 transmits the translated data back to the first processing device through the memory card slot.

Figure 4:
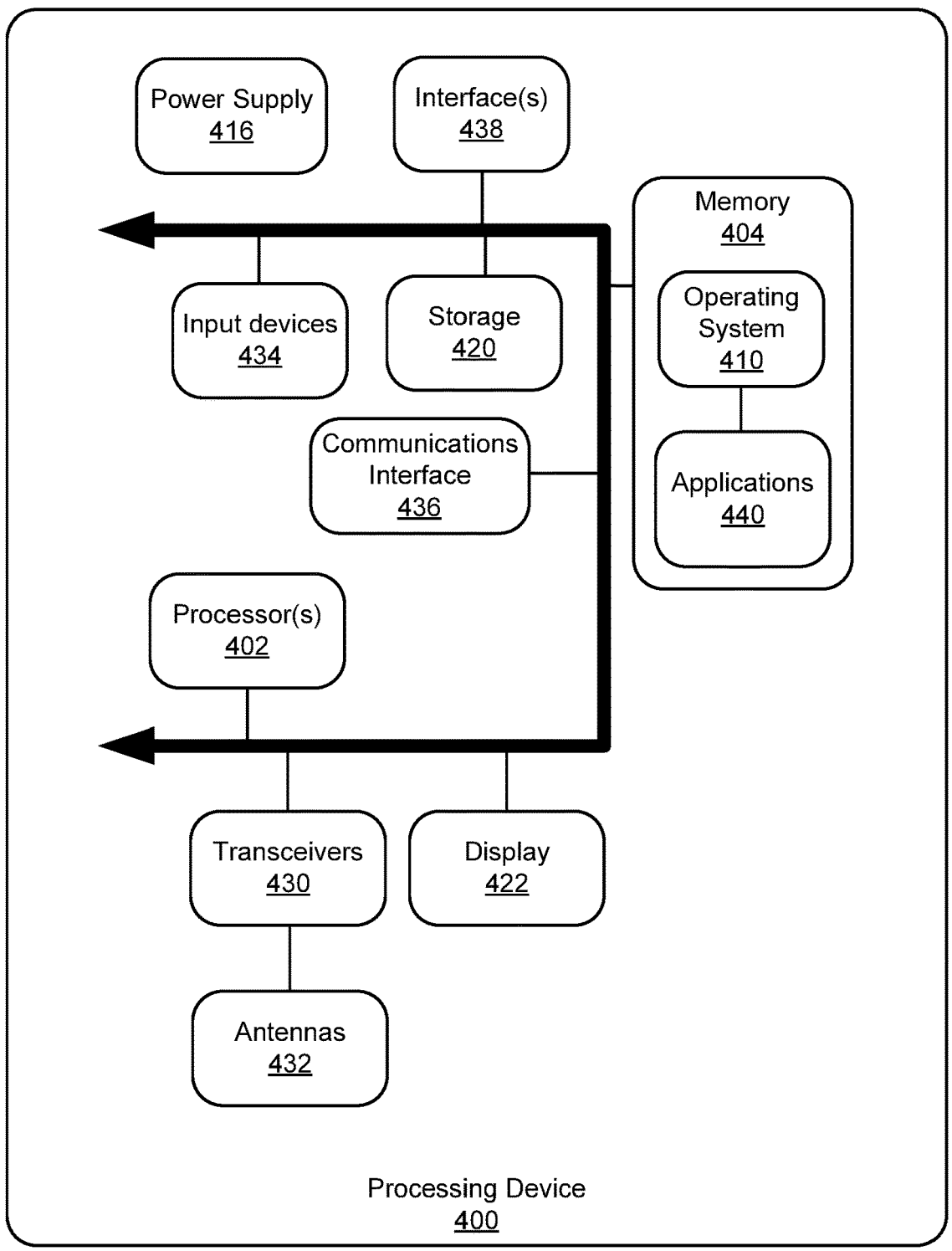
FIG. 4 illustrates an example schematic of a processing device that may be suitable for implementing aspects of the disclosed technology

FIG. 4 illustrates an example schematic of a processing device 400 that may be suitable for implementing aspects of the disclosed technology. The processing device 400 may, for example, represent either one of the processing devices 106 and 108 shown in FIG. 1. The processing device 400 includes one or more processor(s) 402, memory 404, a display 422, and other interfaces 438 (e.g., buttons). The memory 904 generally includes both volatile memory (e.g., RAM) and non-volatile memory (e.g., flash memory). An operating system 410, such as the Microsoft Windows® operating system, the Microsoft Windows® Phone operating system or a specific operating system designed for a gaming device, resides in the memory 404 and is executed by the processor(s) 402, although it should be understood that other operating systems may be employed.

One or more applications 440 are loaded in the memory 404 and executed on the operating system 410 by the processor(s) 402. Applications 440 may receive input from various input local devices (not shown) such as a microphone, keypad, mouse, stylus, touchpad, joystick, etc. Additionally, the applications 440 may receive input from one or more remote devices, such as remotely-located smart devices, by communicating with such devices over a wired or wireless network using more communication transceivers 430 and an antenna 432 to provide network connectivity (e.g., a mobile phone network, Wi-Fi®, Bluetooth®). The processing device 400 further includes storage 420 and a power supply 416, which is powered by one or more batteries and/or other power sources and which provides power to other components of the processing device 400. The power supply 416 may also be connected to an external power source (not shown) that overrides or recharges the built-in batteries or other power sources.

The processing device 900 may include a variety of tangible computer-readable storage media and intangible computer-readable communication signals. Tangible computer-readable storage can be embodied by any available media that can be accessed by the processing device 900 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 900. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes an adapter comprising a first coupling component that couples with a memory card slot on a first processing device; a second coupling component adapted to mechanically and electrically couple the adapter to a second processing device, the adapter providing a communication channel between the first processing device and the second processing device; and a controller adapted to convert a data signaling protocol used by the first processing device to a data signaling protocol used by the second processing device.

In one example system of any preceding system, the first coupling component has a memory card form factor and the second coupling component has a different form factor.

In yet another example system of any preceding system, the first coupling component includes a PCI express (PCIe) link that is adapted to mate with a PCI-based memory card expansion slot on the first processing device.

In still yet another example system of any preceding system, the PCI-based memory card expansion slot on the second processing device is a compact flash express (CFX) port.

In still another example system of any preceding system, the second coupling component includes an input/output port adapted to mate with a male USB Type-C connector.

In yet still another example system of any preceding system, the controller is a Thunderbolt controller.

In still another example system of any preceding system, the controller provides a signal received from the second processing device to one or more discrete lanes of a PCI express (PCIe) link without storing data transmitted via the signal locally within the adapter.

An example method disclosed herein includes receiving a data signal at a first coupling component of an adapter; converting a signaling protocol of the data signal from a first protocol used by the first processing device to a second signaling protocol used by a second processing device; and directing the converted data signal through the memory card slot through the adapter and to a second coupling component. The first coupling component is coupled with a memory card slot on a first processing device and the second coupling component provides a data transmission path to the second processing device.

In yet another example method of any preceding method, the first coupling component is of a first form factor adapted to mate with the memory card slot and the second coupling component is of a second form factor, the first form factor being different from the second form factor.

In still yet another example method of any preceding method, the first coupling component includes a PCI express (PCIe) link that is adapted to mate with a PCI-based memory card expansion slot on the first processing device.

In yet still another example method of any preceding method, the PCI-based memory card expansion slot on the second processing device is a compact flash express (CFX) port.

In another example method of any preceding method, the second coupling component is an input/output port adapted to mate with a male USB TYPE-C connector.

Yet still another method according to any preceding method comprises communicating the data signal through a controller positioned in a data path between the second coupling component and the first coupling component.

In yet another method according to any preceding method, the controller is a Thunderbolt controller.

In still another method of any preceding method, the controller provides signals received from the second processing device to one or more discrete lanes of a PCI express (PCIe) link without storing data included within the signals locally within the adapter.

In yet still another method of any preceding method, the controller provides a signal received from the second processing device to one or more discrete lanes of a PCI express (PCIe) link without storing data transmitted via the signal locally within the adapter.

An adapter disclosed herein comprises a first coupling component for establishing a data transmission path to a first processing device, the first coupling component including a PCI express (PCIe) link adapted to mate with a PCI-based memory card slot on the first processing device; a second coupling component for establishing a data transmission path to a second processing device, the second coupling component being of a different form factor than the first coupling component; and a controller that communicates data signals bidirectionally between the first coupling component and the second coupling component.

In another example adapter according to any preceding adapter, the second coupling component is a Type-C USB port and the controller is a Thunderbolt controller.

In yet still another example adapter according to any preceding adapter, the PCI-based memory card expansion slot on the first processing device is a compact flash express (CFX) port.

In still yet another example adapter according to any preceding adapter, the second coupling component is an input/output port adapted to mate with a male USB TYPE-C connector.

Yet another example system disclosed herein includes a means for receiving a data signal at a first coupling component of an adapter; a means for converting a signaling protocol of the data signal from a first protocol used by the first processing device to a second signaling protocol used by a second processing device; and a means for directing the converted data signal through the memory card slot through the adapter and to a second coupling component. The first coupling component is coupled with a memory card slot on a first processing device and the second coupling component provides a data transmission path to the second processing device.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:
1. A system comprising:
an adapter that adapts a memory card slot on a first processing device for use as a communication channel to export data from the first processing device to an external storage drive, the adapter including:
  a first coupling component with a memory card form factor that couples with a memory card slot on a first processing device;
  a second coupling component with a form factor different from the first coupling component, the second coupling component adapted to mechanically and electrically couple the adapter to the external storage drive, the adapter being separate from the external storage drive and providing the communication channel between the memory card slot of the first processing device and the external storage drive; and
  a controller adapted to convert a data signaling protocol used by the first processing device to a data signaling protocol used by the external storage drive.

2. The system of claim 1, wherein the first coupling component includes a PCI express (PCIe) link that is adapted to mate with the memory card slot, wherein the memory card slot is a PCI-based memory card expansion slot on the first processing device.

3. The system of claim 2, wherein the PCI-based memory card expansion slot on the first processing device is a compact flash express (CFX) port.

4. The system of claim 1, wherein the second coupling component includes an input/output port adapted to mate with a male USB Type-C connector.

5. The system of claim 1, wherein the controller is a Thunderbolt controller.

6. The system of claim 1, wherein the controller provides a signal received from the external storage drive to one or more discrete lanes of a PCI express (PCIe) link without storing data transmitted via the signal locally within the adapter.

7. A method comprising:
receiving a data signal at a first coupling component of an adapter being configured to adapt a memory card slot on a first processing device for use as a communication channel to export data from the first processing device to an external storage drive, the first coupling component of the adapter having a memory card form factor and being coupled with the memory card slot on the first processing device;
converting a signaling protocol of the data signal from a first protocol used by the first processing device to a second signaling protocol used by an external storage; and
directing the converted data signal through the memory card slot and through the adapter to a second coupling component, the second coupling component having a form factor different than the first coupling component and providing a data transmission path to the external storage drive.

8. The method of claim 7, wherein the first coupling component includes a PCI express (PCIe) link that is adapted to mate with the memory card slot and wherein the memory card slot is a PCI-based memory card expansion slot on the first processing device.

9. The method of claim 8, wherein the PCI-based memory card expansion slot on the external storage drive is a compact flash express (CFX) port.

10. The method of claim 8, wherein the second coupling component is an input/output port adapted to mate with a male USB TYPE-C connector.

11. The method of claim 8, further comprising:
communicating the data signal through a controller positioned in a data path between the second coupling component and the first coupling component.

12. The method of claim 11, wherein the controller is a Thunderbolt controller.

13. The method of claim 11, wherein the controller provides signals received from the external storage drive to one or more discrete lanes of a PCI express (PCIe) link without storing data included within the signals locally within the adapter.

14. The method of claim 11, wherein the controller provides a signal received from the external storage drive to one or more discrete lanes of a PCI express (PCIe) link without storing data transmitted via the signal locally within the adapter.

15. An adapter that adapts a memory card slot on a first processing device for use as a communication channel to export data from the first processing device to an external storage drive, the adapter comprising:
a first coupling component for establishing a data transmission path to a first processing device, the first coupling component having a memory card form factor and including a PCI express (PCIe) link adapted to mate with a PCI-based memory card slot on the first processing device;
a second coupling component for establishing a data transmission path to the external storage drive, the second coupling component being of a different form factor than the first coupling component; and
a controller that communicates data signals bidirectionally between the first coupling component and the second coupling component and that converts a data signaling protocol used by the first processing device to a data signaling protocol used by the external storage drive.

16. The adapter of claim 15, wherein the second coupling component is a Type-C USB port and the controller is a Thunderbolt controller.

17. The adapter of claim 15, wherein the PCI-based memory card expansion slot on the first processing device is a compact flash express (CFX) port.

18. The method of claim 15, wherein the second coupling component is an input/output port adapted to mate with a male USB TYPE-C connector.

* * * * *